United States Patent Office 2,822,355
Patented Feb. 4, 1958

2,822,355

STOPPING AGENT FOR VINYL CHLORIDE POLYMERIZATION

Byron H. Werner, Akron, Ohio, assignor to The Firestone Tire & Rubber Company, Akron, Ohio, a corporation of Ohio No Drawing. Application June 20, 1955
Serial No. 516,791

4 Claims. (Cl. 260—87.5)

This invention relates to stopping agents for arresting the polymerization of vinyl chloride and mixtures thereof with compounds copolymerizable therewith.

In the production of vinyl chloride resins, it is often desirable to arrest the polymerization reaction by which these resins are produced at some stage prior to that at which the reaction would ordinarily come to a halt. Arresting the reaction at this point avoids the development of hyper-polymerized nuclei in the resin which show up as "fish eyes" and other discontinuities in final products made from the resins. Particularly when the resins are produced in aqueous suspension, as distinguished from emulsion or solution polymerization, it is desirable to arrest the polymerization at comparatively early stages, for instance when as little as 40–85% of the vinyl chloride has become polymerized, since the resins so produced have a much better "dryness" characteristic—that is, when they are mechanically mixed with liquid plasticizers, these plasticizers are completely imbibed in the interior of the resin granules, leaving the resin as a whole in the form of a "dry" freely flowable powder. Reagents added to vinyl chloride polymerization masses in order to effect such stopping are subject to a number of important requirements. In the first place, they must be highly effective in very small amounts in order that the cost of the stopping agent may not be excessive in relation to the resin produced, and in order to avoid complications by the introduction of extraneous material into the resin. Secondly, they should present no unreasonable hazards such as toxicity or explosiveness. Thirdly, since traces of the stopping agent will unavoidably be left in the polymerization equipment, the stopping agents should have no effect on the polymerization reaction below a certain threshold concentration, in order that the traces retained in the equipment may not interfere with subsequent polymerization reactions. Finally, since it is impractical to remove the agents from the resins, they must not adversely affect the resin in subsequent processing or use.

Accordingly, it is an object of this invention to provide a novel and efficient stopping agent for vinyl chloride polymerization.

Another object is to provide such a stopping agent which is highly effective in low concentrations.

A further object is to provide such an agent which is inexpensive in relation to the amounts thereof required to arrest the polymerization reaction.

A further object is to provide such an agent which is free from industrial hazards such as toxicity, explosiveness, corrosiveness or the like.

Still another object is to provide such an agent which, in the trace amounts in which it is retained in polymerization equipment, will have no effect, either adverse or otherwise, upon subsequent polymerization reactions carried out in the equipment.

A still further object is to provide such a stopping agent which has no adverse effect upon the resin produced in the reaction stopped by such agent.

The above and other objects are secured, in accordance with this invention, by the incorporation, into a mass in which vinyl chloride is being polymerized, of at least 0.1 part of butadiene monoxide, based on the weight of vinyl chloride in such polymerization mass. The polymerization is thereby abruptly and completely terminated and is prevented from recommencing during any further operation to which the mass may be subjected, such as stripping, washing, blending, etc. There is no theoretical upper limit to the amount of butadiene monoxide which may be used in this manner; however, quantities greater than about 0.25%, based on the weight of vinyl chloride in the polymerization mass, will ordinarily be unnecessary and wasteful. As high as 5% can be used without technical difficulty. When used within these concentration limits, the amount of the butadiene monoxide left by clingage, adsorption, etc. in the polymerization vessel will not interfere with any subsequent polymerizations which may be conducted in the equipment.

The invention has a special application to the stopping of reactions in aqueous suspension polymerization masses at relatively low degrees of conversions, for instance at conversions of from 50% to 85% of the vinyl chloride in the reaction mass. At such a stage in the polymerization, the reaction is proceeding with considerable vigor and the stopping agent must be a very effective one in order to bring the reaction to a halt at this point. It is nevertheless very desirable to arrest such polymerizations at these relatively low conversions, as the resins resulting therefrom have greatly improved "dryness" characteristics as compared to resins produced in reactions which are permitted to proceed to higher degrees of conversion. That is, the resins produced in a reaction which has been stopped at an early stage have much greater porosity in their individual granules which causes them to imbibe liquid plasticizers which may be added thereto in processing. The resins which have imbibed the liquid plasticizers in this manner retain their character as dry, free flowing powders, in contrast to resins which do not have this property and which take on the form of wet, lumpy masses.

The present invention is applicable to reactions in which vinyl chloride is being polymerized alone or to reactions in which vinyl chloride is being copolymerized with minor proportions of other unsaturated compounds copolymerizable therewith so that the reaction remains essentially one of polymerization of vinyl chloride. This will include the polymerization of vinyl chloride with not more than 40%, based on total weight of monomers, of these extraneous unsaturated compounds, or conversely stated the polymerization medium must contain at least 60% of vinyl chloride, all percentages being based on the total amount of monomeric substances in the reaction mass. Suitable compounds for copolymerization with vinyl chloride include, for instance, vinyl esters on the order of vinyl bromide, vinyl fluoride, vinyl acetate, vinyl chloroacetate, vinyl butyrate, other fatty acid vinyl esters, vinyl alkyl sulfonates and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate, and the like; vinylidene compounds on the order of vinylidene chloride, vinylidene bromide, vinylidene fluorochloride, and the like; unsaturated hydrocarbons such as ethylene, propylene isobutene and the like; allyl compounds such as allyl acetate, allyl chloride, allyl ethyl ether and the like; and conjugated and cross-conjugated ethylenically unsaturated compounds such as divinyl ketone and the like. For a fairly complete list of materials known to polymerize with vinyl chloride, reference may be had to Krczil, "Kurzes Handbuch der Polymerizations-Technik—II. Mehrstoff Polymerization," Edwards Bros. Inc., 1945, pp. 735–747, the items under "Vinyl chlorid." Instead of the single unsaturated comonomers of the types above indicated, mixtures of such comonomers may enter into the copolymers, it being understood that the total quantity thereof shall be small enough (i. e., not over 40%, based on the weight of copolymer) that the essential character of the polyvinyl chloride chain is retained.

As noted hereinabove, the stopping agent of this invention is of particular application to polymerization reactions conducted by what is known as the aqueous suspension technique. The suspension polymerization processes in connection with which the stopping agent of this invention may advantageously be practiced comprises agitating and dispersing the vinyl chloride and any copolymers in an aqueous medium, using principally non-micelle-forming suspending agents to prevent coalescence of the dispersed monomers. Monomer-soluble polymerization initiators are incorporated into the charge, and conditions of temperature are adjusted to cause polymerization to take place. In contrast to emulsion polymerization, in which the monomers diffuse through the aqueous medium into the emulsifier micelles and there undergo polymerization, the monomers in suspension polymerization undergo polymerization in the original droplets in which they are dispersed in the water. In suspension polymerization, the monomeric constituents of the charge constitute from 10 to 60% of the total weight of monomers plus water. The non-micelle-forming suspending agents are typical protective colloid materials on the order of gelatin, starch, polyvinyl alcohol, polyacrylic acid, polymaleic acid, gum tragacanth, sodium silicate, bentonite, talc, kaolin and the like. Generally, these are employed to an extent sufficient to increase the viscosity of the aqueous medium to about 10 centipoises; 0.05 to 1.0% of these agents, based on the weight of water in the charge, are usually employed and sufficient for this purpose. The polymerization initiator employed is of a type soluble in the vinyl chloride phase, typical initiators of this sort being acyl peroxides and hydroperoxides such as benzoyl peroxide, acetyl peroxide, lauroyl peroxide, caproyl peroxide, peracetic acid, perbenzoic acid and the like; and hydrocarbon peroxides and hydroperoxides such as t-butyl hydroperoxide, cumene hydroperoxide, ascaridole and the like. The initiator system in some cases also includes a redox complex, including usually an oxidizing agent (commonly supplied by the peroxide initiator), a versivalent metal compound (e. g., an iron compound) and a reducing agent (e. g., sodium bisulfite, a reducing sugar or the like). The polymerization is conducted with sufficient agitation to ensure the dispersal of the monomer as droplets in the aqueous phase, and to ensure the persistence of the droplets throughout the reaction. The polymerization is usually carried out at temperatures in the range of 45° to 100° C. which range may be broadened to 0° to 100° C. where active catalyst systems (such as those involving redox combinations) are employed. The polymerization is continued until the degree of polymerization has been achieved at which it is desired to arrest the polymerization. For best results in improving the plasticizer imbibition properties of the resultant resins, the polymerization should be arrested at a point at which from about 50% to about 85% of the monomers charged into the reaction mass have been polymerized.

With the foregoing general discussion in mind, there are given herewith detailed specific examples of the practice of this invention. All parts and percentages given are by weight unless otherwise specified.

EXAMPLE I

Stopping efficiency

Polymerization charge: Grams
  Vinyl chloride _____ 100
  Distilled water _____ 122
  Gelatin _____ 0.6
  Lauroyl peroxide _____ 0.2
  Sodium acetate _____ 0.2
Stopping agent:
  Butadiene monoxide _____ Per Table I A series of vinyl chloride polymerization runs was made in accordance with the foregoing recipe, using various amounts of butadiene monoxide at the close of the reaction. In each run, all of the listed ingredients except the butadiene monoxide were charged into a 24-ounce polymerization bottle, which was then sealed with a crown cap having a rubber gasket (previously acetone-extracted) and a perforation in the cap to allow hypodermic injection of the stopping agent. The bottles were then placed on a polymerization wheel which dipped and tumbled the bottles in a water bath at 50° C. for 10.5 hours. At this time, the bottles were removed (including a control bottle into which no stopping agent was to be injected but which was removed so that its thermal history would parallel that of the other bottles) and predetermined amounts of the butadiene monoxide were injected hypodermically. The bottles were then replaced on the wheel and polymerization continued for an additional 11 hours. At the end of this time, the bottles were removed, the excess monomer vented by puncturing the caps, and the amount of polymer in the several bottles determined by filtering the polymer from the liquid contents, drying and weighing the polymer. Set forth herewith are the results of the several runs.

TABLE I

| Run No. | Grams of Butadiene Monoxide Added | Grams of Polymer Produced |
|---|---|---|
| 1 | 0 (control) | 84.0 |
| 2 | 0.005 | 74.2 |
| 3 | 0.05 | 68.0 |
| 4 | 0.1 | 49.6 |
| 5 | 0.25 | 41.4 |

EXAMPLE II

Avoidance of poisoning of reactor

A polymerization run was carried out similarly to the runs in the preceding example, except that an excessive amount (0.5 gram) of butadiene monoxide was injected for stopping purposes. When the polymerization mass was discharged, the bottle was not rinsed, but was left wet and contaminated with such particles of polymer as could not easily be shaken from the interior surfaces of the bottle. The bottle was then recharged with the "polymerization charge" ingredients of the recipe in Example I, and the bottle tumbled on the polymerizing wheel as before for 23 hours. The yield of polymer on this second run was 89 grams, which is of the order of the yield of the unstopped control run No. 1 of Table I, indicating that the carryover of butadiene monoxide was insufficient to interfere with the polymerization reaction.

EXAMPLE III

Absence of impairment to the resin

Grams
Polymer under test (from Table I, run 1 or 5) __ 40
Dioctyl phthalate _____ 18.4
Tricalcium phosphate _____ 0.4
Calcium stearate _____ 0.2
Celite superfloss _____ 0.6
Cadmium lauryl mercaptide _____ 0.8

Two tests were made in accordance with the above recipe, one using the stopped resin (run No. 5) and one the unstopped resin (run No. 1) of Example I. In each test, the ingredients were thoroughly mixed in a beaker, and then milled together on a laboratory roll mill for two minutes at 320° F., after which the resultant blend was sheeted off at a thickness of 0.25 inch, and cooled. Specimens were exposed in a forced draft oven at 180° C. for one-fourth, one-half, one, one and one-half, and two hours. No difference in ageing characteristics could be observed between the specimens from stopped and unstopped resin.

From the foregoing general discussion and detailed specific examples, it will be seen that the use of butadiene monoxide in accordance with this invention provides a highly effective means for arresting the polymerization of vinyl chloride and mixtures containing the same. While the butadiene monoxide is highly effective in very minute proportions, yet the unavoidable carryover thereof in the polymerization equipment from one run to another does not adversely affect subsequent polymerization reactions. Further, no adverse effects are produced upon the products of polymerizations arrested in accordance with this invention. The butadiene monoxide, in the small amounts in which it is used in this invention, does not add materially to the cost of the polymeric product.

What is claimed is:

1. Method of arresting the polymerization of a substance selected from the group consisting of vinyl chloride and mixtures thereof with other ethylenically unsaturated compounds containing at least 60% of vinyl chloride, based on the weight of said mixtures, which comprises adding from 0.1 to 5.0%, based on the weight of said selected substance of butadiene monoxide to said selected substance after said selected substance has become polymerized to the extent of from 50% to 85%.

2. Method of arresting the polymerization of vinyl chloride, which comprises adding from 0.1 to 5.0%, based on the weight of vinyl chloride, of butadiene monoxide thereto after the vinyl chloride has become polymerized to the extent of from 50% to 85%.

3. Method of arresting the polymerization, in aqueous suspension, of a substance selected from the group consisting of vinyl chloride and mixtures thereof with other ethylenically unsaturated compounds containing at least 60% of vinyl chloride, based on the weight of said mixtures, which comprises adding from 0.1 to 5.0%, based on the weight of said selected substance of butadiene monoxide to said selected substance after said selected substance has become polymerized to the extent of from 50% to 85%.

4. Method of arresting the polymerization, in aqueous suspension, of vinyl chloride, which comprises adding from 0.05 to 5 parts, per 100 parts of vinyl chloride, of butadiene monoxide thereto after said vinyl chloride has become polymerized to the extent of from 50% to 85%.

References Cited in the file of this patent

UNITED STATES PATENTS

| | | |
|---|---|---|
| 2,570,601 | Schmerling | Oct. 9, 1951 |
| 2,616,883 | Marous | Nov. 4, 1952 |

FOREIGN PATENTS

| | | |
|---|---|---|
| 119,398 | Australia | Jan. 3, 1945 |

U. S. DEPARTMENT OF COMMERCE
PATENT OFFICE
CERTIFICATE OF CORRECTION

Patent No. 2,822,355            February 4, 1958

Byron H. Werner

It is hereby certified that error appears in the printed specification of the above numbered patent requiring correction and that the said Letters Patent should read as corrected below.

Column 6, lines 2 and 16, after "substance", each occurrence, insert a comma.

Signed and sealed this 29th day of April 1958.

(SEAL)
Attest:

KARL H. AXLINE

Attesting Officer                                  ROBERT C. WATSON
                                                                             Commissioner of Patents